(12) United States Patent
Badalyan

(10) Patent No.: US 11,318,389 B2
(45) Date of Patent: May 3, 2022

(54) APPARATUS AND METHODS FOR VIRTUAL GAMING TERMINALS

(71) Applicant: SC IP Limited, Douglas (GB)

(72) Inventor: Vigen Badalyan, St. Julian's (MT)

( * ) Notice: Subject to any disclaimer, the term of this patent is extended or adjusted under 35 U.S.C. 154(b) by 0 days.

(21) Appl. No.: 17/046,960

(22) PCT Filed: Apr. 13, 2019

(86) PCT No.: PCT/IB2019/053060
§ 371 (c)(1),
(2) Date: Oct. 12, 2020

(87) PCT Pub. No.: WO2019/198059
PCT Pub. Date: Oct. 17, 2019

(65) Prior Publication Data
US 2021/0146259 A1    May 20, 2021

(30) Foreign Application Priority Data

Apr. 13, 2018   (GB) ...................................... 1806089

(51) Int. Cl.
*A63F 13/73*    (2014.01)
*A63F 13/63*    (2014.01)

(52) U.S. Cl.
CPC .............. *A63F 13/73* (2014.09); *A63F 13/63* (2014.09)

(58) Field of Classification Search
CPC ............ A63F 13/60; A63F 13/63; A63F 13/73
See application file for complete search history.

(56) References Cited

U.S. PATENT DOCUMENTS

| 8,328,610 B2 | 12/2012 | Shimura | |
| 2002/0013173 A1* | 1/2002 | Walker | G07F 17/323 463/40 |
| 2002/0151366 A1* | 10/2002 | Walker | G07F 17/32 463/42 |
| 2008/0016176 A1 | 1/2008 | Leitner | |
| 2014/0047413 A1 | 2/2014 | Shieve | |
| 2015/0087369 A1* | 3/2015 | McIntyre | G07F 17/34 463/11 |
| 2015/0235517 A1 | 8/2015 | Griffen | |

OTHER PUBLICATIONS

International Search Report and Written Opinion in co-pending PCT/IB2019/053060, dated Jul. 1, 2019, 8 pages.

\* cited by examiner

*Primary Examiner* — James S. McClellan
(74) *Attorney, Agent, or Firm* — Keith Lutsch PC

(57) ABSTRACT

An apparatus and method for creating and/or editing a game adapted to comprise at least a front engine and a back engine, the front engine comprising a user interface having a dashboard for providing information about the operation status of the data processing unit and menu options for accessing one or more layers in dependence on a user authentication status, the back engine comprising a user interface comprising menu options for accessing one or more layers in dependence on a user authentication status.

14 Claims, 1 Drawing Sheet

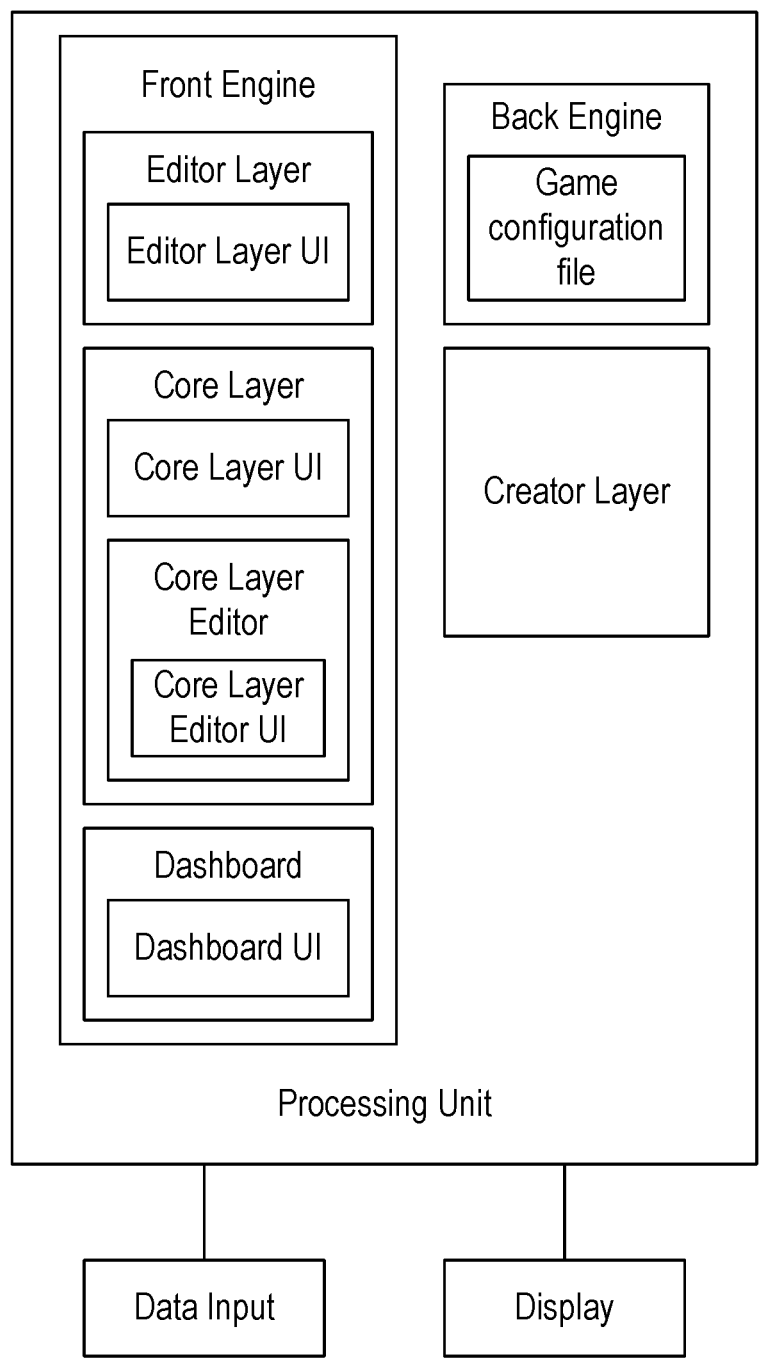

APPARATUS AND METHODS FOR VIRTUAL GAMING TERMINALS

FIELD OF THE INVENTION

The present invention relates to apparatus and methods for virtual gaming terminals.

BACKGROUND TO THE INVENTION

Many different games are known. Some games are played with physical apparatus, such as board games or card games or slot machine type games (sometimes referred to as fruit machines). Other games are played on an electronic device such as a computer. It is also desirable to provide computer-based versions of popular physical games in a virtual gaming terminal, such as virtual slot machines for example.

Computer games generally fall into two categories: a first in which game software is installed and run on the player's computer and a second in which game software is installed on a remote server and run through a browser, sometimes including portions which are temporarily downloaded onto a player's computer and run thereon.

Games may be provided as a "service". In such circumstances a game provider may provide access to a game to a player on a subscription basis, for example. One advantage of an arrangement such as this is that the provider may provide a wide variety of different games to a player; the player has access to a wider variety of different games during the period of subscription.

However to maintain ongoing interest from a player, a game provider ought to provide an ongoing supply of different games.

Thus, a need arises for a game provider to be able to create and edit games relatively straightforwardly.

However, games in their broad sense are difficult to create: they generally require design and manufacture of physical apparatus. Computer based games generally require professional programming of computer apparatus.

It is to these amongst other problems which the invention seeks to provide a solution.

SUMMARY OF INVENTION

In a first aspect, the present inventive concept is directed to an apparatus for creating and/or editing a virtual gaming terminal, the apparatus comprising a data processing unit, data input means and display means, wherein the data processing unit is adapted to comprise at least a editor layer and a core layer, the layers operating independently from one another, wherein each layer comprises a plurality of programmable elements relating to a set of possible features of a related game, the data processing unit being further adapted to comprise at least a front engine and a back engine, the front engine comprising a user interface having a dashboard for providing information about the operation status of the data processing unit and menu options for accessing one or more layers in dependence on a user authentication status, the back engine comprising a user interface comprising menu options for accessing one or more layers in dependence on a user authentication status.

The apparatus thus provides a platform on which users can create and/or edit a virtual gaming terminal without the requirement for heavy investment in skilled programming effort. Due to the presence of different layers, different aspects of a virtual gaming terminal can be created and/or edited according to a user's technical skills. Thus, the present inventive concept provides for creation and/or editing of virtual gaming terminals by users without high levels of programming skills—who may not have been able to create and/or edit virtual gaming terminals previously.

A layer comprises a set of selectable factors relating to the part of the game to be created to which the layer is directed.

The editor layer includes game parameters such as the position and properties of an element such as a canvas element, such properties including size, colour, opacity, visibility, angle, amination parameters, fonts, font styles, alignment, stroking, shadowing, text wrapping and the like. A user with the appropriate authentication status may upload images, fonts, video and audio files, add "plugins" etc. to the editor layer.

The core layer includes game parameters such as rules as to how elements of the game interact with one another, how the game is configured, how files and assets are stored and used as part of the game, the core layer may also include controls such as the creation of elements such as canvas elements.

Thus, a game may comprise a certain set of rules which set out how the game is played and how one or more users interact with the game, those rules being independent from higher-level aspects of the game such as audio-visual features. Thus, a user of the present apparatus may design a game in which the rules are common between different games but which differ in higher-level features.

The present inventive concept allows for differing degrees of granularity so that different users can adapt available features to generate virtual gaming terminals with games to different degrees of detail.

Thus, for example, an administrator user may be able to set up a certain set of rules for a game which meet predetermined requirements for the probability of winning the game, prize payouts, player skill level needs, and other related factors. A graphic design user may be restricted from making changes to those rules but may nonetheless be able to make changes to the visual or audio-visual aspects of the game.

The present inventive concept thus provides a tool for creating a wide range of different games, useable by different users at different degrees of complexity or granularity.

A further layer may be a creator layer, in which game parameters of the editor layer and core layer as set out above may be generated. The creator layer may thus be used to generate every aspect of a game as a new game. The creator layer may be accessed only by users with a pre-determined authentication status.

In dependence on a user authentication status, the dashboard may display a table of created games, display game revenue information, display user interface options to create a new game, edit an existing game and remove an existing game.

The apparatus may further comprise means for generating one or more random or pseudo-random numbers.

In a second aspect, the present inventive concept is directed to a method for creating and/or editing a virtual gaming terminal using a data processing unit which is connected to a data input means and display means, the method comprising the steps of:

authenticating a user at a certain level;

in dependence on the user authentication level, allow or deny access to the user to one or more of: a front engine, a back engine, a dashboard of the front engine, information about the operation status of the data processing unit, menu options for accessing one or more layers.

The said menu options may—in dependence on the user authentication level—include creating, editing or deleting aspects of a game in one or more layers.

The said layers may include an editor layer, a core layer and a creator layer.

The dashboard, layers and front and back engines are substantially as described above in relation to the first aspect.

BRIEF DESCRIPTION OF THE FIGURE

FIG. 1 is a block diagram of an apparatus for creating and editing a virtual gaming terminal according to the present invention.

DETAILED DESCRIPTION OF THE INVENTION

Exemplary embodiments of the present inventive concept will now be described in relation to a virtual gaming terminal for a "slot" type game. In the below example, certain abbreviations will be understood by the skilled person to refer to presently-understood and available computer platforms, protocols, languages and the like. For example there are references to PHP—a programming or scripting language, APIs—application programming interfaces, HTTP—hypertext transfer protocol and related commands, DOM—document object model.

A First Possible Embodiment

After a user logs in, a user activity information page is shown. From here he or she can create a new game.

In a game options selection page, the user can choose new game creation options step-by-step. The front-end sends those options to the back-end. The back-end program selects an appropriate "json" configuration file corresponding to the selected options, and can also make some changes to those files to create the selected configuration.

After this step a game editing page opens: the game opens with default configurations in a canvas element. In this page there are two program sections: an editor and the game. In the editor the user can change game element parameters, such as position, colour, sizes, visibility, font, animation parameters, angle, line spacing etc. Here the user can also upload images, fonts, videos, audio files etc. that will be used in game. After uploading many images for creating an animation effect, the back-end creates a sprite sheet from those images and other elements. All assets and configuration files are collected in the game folder for the particular game.

At each change, the editor program calls an appropriate function of the game program in order that changes are immediately reflected on the canvas, generating a new game. The game program also calls editor programs appropriate functions to:

a. Show canvas element's sizes.

b. Open appropriate section in the editor for editing the element which the user selected.

c. Return position coordinates of a dragged element.

All changes are then sent to a server when the user clicks a "save" button, so the changes are written in configuration "json" files.

A Second Possible Embodiment

The front end is a single page application with following routes:

1. '/'—a start/introduction page with "sign in" and "register" buttons.

2. '/dashboard'—a start page of application with created games table, game revenue information charts, possibility to create new game, edit and remove old ones.

3. "/game/create"—an application page that allows a user to choose new created game options, with different views for different options, called "steps".

4. "/game/{game identification number}/edit"—an application page for editing various game parameters including setting images, videos, sounds, adding new components, changing canvas elements, drawing parameters like positions, colours, scaling, fonts, text sizes.

The back end part comprises PHP scripts including the following API(s):

1. /api/v1/user—this expects HTTP/GET request and returns user information if there is session for a logged in user.

2. /api/v1/user/login—this expects an HTTPS/POST request with user email and password and create new session and returns user information along with login type.

3. /api/v1/games—this expects an HTTP/GET request and returns a games list from a database for a logged in user. User information is obtained from a session created when a user logs in.

4. /api/v1/games/{game identification number}—this expects an HTTP/GET request and returns all options information for the game with a "game identification number" from database.

5. /api/v1/games/{game id}/approve—(available for administrator's use) Expects an HTTP/POST request with game information, and updates a game status for the game with an identification number in a database as 'approved'. Available statuses are:

a. "in progress": game is in the editing process.

b. "in review": a user has finished creating or editing a game and sends it for review to an administrator.

c. "deleted": a user deletes a created game.

d. "approved": a game reviewed has been created/edited and approved by an administrator.

e. "live": a game is installed on a server for public use.

f. "declined": a game is reviewed and declined by administrator, in order to be edited for a subsequent review.

6. /api/v1/games/{game id}/decline (available for administrator's use) Expects an HTTP/POST request with game information, and updates game status for the game with an identification in a database as 'declined'.

7. /api/v1/games/{game id}/export (available for administrator's use). Expects an HTTP/POST request with game information and prepares and installs game files in the appropriate locations for play. Also updates the status in database. Primarily for one of more of preparing actions including various optimisations such as merging configuration files, cleaning superfluous information from configuration files, removing unused resource files, compressing images, grouping them in sprite sheets, merging sprite sheet "json" files into one and other functions.

8. '/api/v1/game/delete/{game id}'—expects an HTTP/POST request with game information, and changes game status to 'deleted' in a database.

9. '/api/v1/icons//{id}/{path}'—expects an HTTP/GET request and returns all images file names available by "path".

10. '/api/v1/icons/'/delete/{id}/{path}/{fileName}'—expects an HTTP/POST request and removes file with {fileName} in the {path} of game with {id}.

11. '/api/v1/icons/createSprite'—expects an HTTP/POST request and creates sprite sheet files from previously uploaded image files.

12. '/api/v1/icons/rebuild—expects an HTTP/POST request and renames uploaded image files to create a new order and creates/recreates sprite sheet files.

13. '/api/v1/icons/clear—expects an HTTP/POST request with path information and removes directory with all files of path.

14. '/api/v1/icons/upload/{game id}/{path}—expects an HTTP/POST request with path information and creates a directory if needed and saves sent files in that directory.

15. '/api/v1/games/create'—expects an HTTP/POST request with new game options and creates a new game project folder, picks configuration files according to selected game options, copies them to the game folder, picks assets files from a default resource folder according to selected game options, copies them to the game folder, adds new game information to a database, and returns new game id.

16. '/api/v1/game/configs'—expects an HTTP/POST request with new configuration data and saves new data into a configuration file.

17. 'api/v1/game/configs/{gameId}/{configName}'—expects an HTTP/GET request and returns game configuration file content.

19. '/api/v1/lang'—expects an HTTP/GET request and returns language specific translation file content.

20. '/api/v1/font/{game}/{name}'—expects an HTTP/POST request and saves uploaded font file for the game.

21. '/api/v1/font/{game}'—expects an HTTP/GET request and scans a font directory and writes font names to a configuration file.

22. '/api/v1/video/upload/{id}/{path}/{pID}'—expects an HTTP/POST request and saves an uploaded video file.

23. '/api/v1/video/{game}/{path}'—expects an HTTP/GET request and returns video file name available by {path}.

24. '/api/v1/games/publish'—expects an HTTP/POST request and changes game status to 'in review'.

27. '/api/v1/audio/{id}/{file}'—expects an HTTP/GET request and returns, whether an audio file exists or not.

28. '/api/v1/audio/'/upload/{id}/{file}'—expects an HTTP/POST request and saves an uploaded audio file.

29. Additionally, various notifications are available for the user, sent by means of websocket interface.

30. /api/v1/games/copy—Expects HTTP/POST request with modified (or not) source game options and id, and creates new game copying source game configurations and assets and adds new configurations and assets if required; according modified options including those missing in the source game.

31. '/api/v1/games/rebuild—Expects HTTP/POST request with modified game options and makes changes (to bot configuration and to asset) on existing game according to new options.

32. '/api/v1/game/configs/reorderChildren'—Expects HTTP/POST request with new z-order information and saves it in configuration file content.

33. '/api/v1/game/configs/deleteItem'—Expects HTTP/POST request and removes configuration section from file and saves information for possible restoration.

34. '/api/v1/game/configs/restoreItem'—Expects HTTP/POST request and restores previously removed section in game's configuration file.

35. 'api/v1/game/configs/removedItems/{game}'—Expects HTTP/GET request and returns removed configuration sections information for the game.

36. '/api/v1/font/remove'—Expects HTTP/POST request and removes font from the game.

37. /api/v1/user/reset—that expects HTTPS/POST request with user email and sends password reset page link with confirmation token to user's email.

38. /api/v1/user/change—that expects HTTPS/POST request user's new password and confirmation token and saves new password for user.

39. /api/v1/audio/upload/{game}/{fileName}—that expects HTTPS/POST request and saves uploaded mp3 file under {fileName}.

40. /api/v1/audio/remove—that expects HTTPS/POST request and removes audio information (from configuration file) and file.

To create a new slot game:

1. The user presses a "Create new Slot" button. Dashboard pages DOM elements are destroyed. Programs navigate to new url: "/game/create" which displays a game parameters selection page. Parameters are selected by the user during several steps, in different views. Navigation between steps is possible either by clicking on "Next", "Previous" buttons or by clicking on a step name in a steps list. Navigation to the view is possible if user has chosen obligatory options in previous steps/views by clicking on appropriate element in the view. When the user enters a value for option or clicks on option to choose, the appropriate parameter is saved in a javascript property. Navigating to another step hides current step specific DOM elements and shows DOM elements (various radio buttons, checkboxes, and other inputs) of the new step in place of the old ones.

2. "Lines Count" is a step/view for choosing a slot game "line count" characteristic. Here there are radio buttons for selecting the number of game lines in a game. This option is obligatory and enables navigation buttons to the next step/view.

3. In preferred embodiments, there is an "Extra Symbols" step/view. In this step user can check "wild" and "scatter" symbols checkboxes. The last one if checked shows one more checkbox for a "free spin" option. Defaults values are "not available".

4. "Gamble Type" is a step/view which shows radio buttons for available "gamble" game types and "no gamble" option that user could choose. After choosing one from available options, navigating to the next step is allowed.

5. "Game Bonus" is a step/view for choosing one of "bonus" game types or a "no bonus" option. A selection here is obligatory.

6. "Jackpot and Multiplier" is a step/view for choosing whether a jackpot win and/or multiplier win will be available in the game. Options are not obligatory and can be omitted—which means the absence of these features.

7. "Game Size" is a step/view which shows two number inputs for game width and height in pixels. The default values are: width 1280 and height 720.

8. "Symbols Count" is a step/view which shows a dropdown menu or in preferred embodiments radio buttons to choose from 8, 11 or 13 for a symbols count for the game. The Default value is 8. One extra "bonus" symbol will be available if one of "bonus" game type is chosen in previous steps.

9. "Game Description" is a step/view which shows two input fields for a game name and a description to be entered. At least one symbol or letter should be written in each of these fields.

10. "Line Type" step/view shows two radio buttons or similar to choose between two types of showing win lines in the game: "stripe" and "image". Default is "stripe".

11. "Save" is a step/view which shows a list of previously chosen options. Here a "Next" button is replaced by a "Finish" button. Clicking on "Finish" sends a request to server with the created game options and expects a new game id as response. After successful passing this step, the game creation page DOM structure is destroyed and a game edit page is created at "/game/{game identification number}/edit".

To edit an existing game:

In this page there are two different parts of the front engine working together: an "editor" layer, and "core" layer with a communication interface module. Here the core layer creates a canvas element and draws there a created game on the basis of passed configuration files and assets. The editor layer provides various DOM elements by which means the user can choose a configuration section, change various game parameters, including canvas element's positions, sizes, colours, opacity, visibility, angle, animation parameters, fonts, font styles, alignment, stroking, shadowing, text wrapping etc. and other game specific parameters. From here the user can also upload images, fonts, video and audio files and in certain embodiments add plugins to the game. The user can also add and remove game elements, change the z-order of the elements, add or remove properties for adding new elements and add or remove specific configurations of or for the games elements for mouse input events (if available). All changes are immediately reflected in the canvas and the user can see the results displayed. The editor layer along with its DOM operations also deals with backend API (listed above) and the game core API, providing also its API to the game core. The game core communication module instance is part of a browser's global Window object allowing the editor layer to use it. In this page a button for sending the game to review is also available.

Game Core API:

1. API for drawing canvas element which configuration options user currently works with.

2. API for updating canvas element's view based on changes a user has made in configuration options in the editor panel.

3. API for navigation through different game states, drawing game view in a chosen state, based on state and configuration information.

4. API for saving state specific parameter changes in a currently running game information structures 7. API for reloading newly uploaded assets and drawing new ones in canvas.

8. API for making a canvas element draggable.

9. API for destroying a created canvas game when navigating away from editing page.

10. API for starting a new game.

11. API for registering a right mouse click event callback.

12. API for registering a canvas element size showing function.

13. API for playing a sound file in the game, when the user selects the appropriate section for editing.

14. API for reloading a sound file used by a game.

15. API for adding/removing game elements whenever user wants.

16. API for changing z-order of game elements

Editor Program API for Game Core Layer

1. API for showing an appropriate section with configuration options for canvas element, on which user may right click.

2. API for showing canvas element sizes a user may currently work with and updating that information in light of size changes.

The invention claimed is:

1. An apparatus for creating and/or editing a virtual gaming terminal, the apparatus comprising:
   a data processing unit;
   data input means; and
   display means,
   wherein the data processing unit is adapted to comprise:
      a front engine; and
      a back engine,
   wherein the front engine comprises:
      an editor layer;
      a core layer; and
      a dashboard,
   wherein the core layer includes a user interface for configuring basic game aspects based on user input and configures the game based on inputs from the core layer user interface, the basic game aspects comprising:
      game type;
      game parameters for each game type, which result in development of generic game elements;
      game element interaction rules; and
      a game canvas including generic game elements,
   wherein the editor layer includes a user interface for configuring audio-visual aspects of the game canvas and generic game elements to develop game specific game elements and configures the game based on inputs from the editor layer user interface,
   wherein the dashboard includes a user interface for providing game operation options, and
   wherein the back engine develops a game configuration file of the game based on output of the front engine.

2. An apparatus according to claim 1, wherein the data processing unit is adapted to comprise a creator layer, in which audio-visual aspects of the editor layer and basic game aspects configurable by the core layer are generated.

3. An apparatus according to claim 1, wherein in dependence on a user authentication status, the dashboard user interface further displays one or more of a table of created games and game revenue information, and wherein the game operation options include to create a new game, edit an existing game and remove an existing game.

4. An apparatus according to claim 1, further comprising a means for generating one or more random or pseudo-random numbers.

5. An apparatus according to claim 1, wherein the core layer further comprises a core layer editor which includes a core layer editor user interface for configuring options and sizes of the canvas layer and configures the game based on inputs from the core layer editor user interface.

6. An apparatus according to claim 1, wherein operation of the core layer and the editor layer are conditioned on authenticating a user at a certain level.

7. An apparatus according to claim 1, wherein audio-visual aspects configurable by the editor layer include a plurality of position, size, colour, opacity, visibility, angle, amination parameters, fonts, font styles, alignment, stroking, shadowing, line spacing, text wrapping, and z-order.

8. A method for creating and/or editing a virtual gaming terminal using a data processing unit connected to a data input means and a display means, the data processing unit is adapted to comprise a front engine and a back engine, wherein the front engine comprises an editor layer; a core layer; and a dashboard, the method comprising:
   the core layer providing a user interface for configuring basic game aspects based on user input and configuring the game based on inputs from the core layer user interface, the basic game aspects comprising:

game type;
game parameters for each game type, which result in development of generic game elements;
game element interaction rules; and
a game canvas including generic game elements,
the editor layer providing a user interface for configuring audio-visual aspects of the game canvas and generic game elements to develop game specific game elements and configuring the game based on inputs from the editor layer user interface,
the dashboard providing a user interface for providing game operation options, and
the back engine developing a game configuration file of the game based on output of the front engine.

9. A method according to claim 8, wherein the data processing unit is adapted to further comprise a creator layer, the method further comprising: the creator layer generating audio-visual aspects of the editor layer and basic game aspects configurable by the core layer.

10. A method according to claim 8, wherein in dependence on a user authentication status, the game operation options include to create a new game, edit an existing game and remove an existing game and the method further comprises the dashboard user interface displaying one or more of a table of created games and game revenue information.

11. A method according to claim 8, further comprising generating one or more random or pseudo-random numbers.

12. A method according to claim 8, wherein the core layer further comprises a core layer editor, the method further comprising:
the core layer editor providing a core layer editor user interface for configuring options and sizes of the canvas layer and configuring the game based on inputs from the core layer editor user interface.

13. A method according to claim 8, wherein operation of the core layer and the editor layer are conditioned on authenticating a user at a certain level.

14. A method according to claim 8, wherein audio-visual aspects configurable by the editor layer include a plurality of position, size, colour, opacity, visibility, angle, amination parameters, fonts, font styles, alignment, stroking, shadowing, line spacing, text wrapping, and z-order.

\* \* \* \* \*